United States Patent
Fike et al.

(10) Patent No.: US 6,312,503 B1
(45) Date of Patent: Nov. 6, 2001

(54) SYSTEM TO QUENCH GASSES AND REMOVE CONDENSABLES

(75) Inventors: Lawrence Robert Fike, Moore, SC (US); Torsten Schmidt, Hofheim am Taunus (DE); Stephen Jonathan Freeman, Baytown, TX (US); Miguel Angel Osornio, Spartanburg, SC (US); Jörg Bartels, Niedernhausen (DE)

(73) Assignee: Arteva North America S.A.R.L., Zurich (CH)

( * ) Notice: Subject to any disclaimer, the term of this patent is extended or adjusted under 35 U.S.C. 154(b) by 0 days.

(21) Appl. No.: 09/417,609

(22) Filed: Oct. 13, 1999

(51) Int. Cl.$^7$ .................................................. B01D 47/14
(52) U.S. Cl. ............................................ 95/211; 95/224
(58) Field of Search .................... 96/290, 300, FOR 123; 95/211, 210, 232, 230, 224

(56) References Cited

U.S. PATENT DOCUMENTS

| | | | | |
|---|---|---|---|---|
| 2,878,107 | * | 3/1959 | Ruth | 96/290 |
| 3,210,914 | * | 10/1965 | Eckert | 96/290 |
| 3,432,994 | * | 3/1969 | Whiton et al. | 95/211 |
| 3,445,182 | * | 5/1969 | Tomany | 95/211 |
| 3,556,490 | * | 1/1971 | Bockman | 95/211 |
| 3,739,551 | * | 6/1973 | Eckert | 95/211 |
| 3,936,281 | * | 2/1976 | Kurmeier | 95/211 |
| 3,944,401 | * | 3/1976 | Dorr et al. | 95/211 |
| 4,110,088 | * | 8/1978 | Cold et al. | 95/211 |
| 4,230,819 | | 10/1980 | Hauenstein et al. | 528/483 |
| 4,263,425 | | 4/1981 | Rothe et al. | 528/309 |
| 4,340,721 | | 7/1982 | Bonnebat et al. | 528/272 |
| 4,356,299 | | 10/1982 | Cholod et al. | 528/279 |
| 5,080,696 | * | 1/1992 | Marchand et al. | 95/211 |
| 5,434,239 | | 7/1995 | Bhatia et al. | 528/274 |
| 5,474,597 | | 12/1995 | Haldin | 95/199 |
| 5,496,778 | * | 3/1996 | Hoffman et al. | 95/211 |
| 5,660,615 | * | 8/1997 | Neumann et al. | 95/211 |

FOREIGN PATENT DOCUMENTS

| | | | | |
|---|---|---|---|---|
| 686101 | * | 5/1964 | (AU) | 95/211 |
| 399085 | * | 11/1990 | (EP) | 95/211 |

* cited by examiner

*Primary Examiner*—Duane S. Smith

(57) ABSTRACT

A method and apparatus for quenching and scrubbing a hot gas using a liquid in a single packed column while controlling mist formation. Hot gas is introduced at the bottom of the column and drawn upward countercurrent to the scrubbing liquid. The column has three stages, each packed and fed liquid from above. The first stage is a quench region wherein the gas flow rate, liquid flow rate and liquid temperature are controlled such that the quench rate does not exceed 5.4° C./ft$^2$ of packing to prevent formation of an aerosol mist. The second and third stages for scrubbing employ packed regions separately supplied with increasingly cooler and purer liquid.

8 Claims, 3 Drawing Sheets

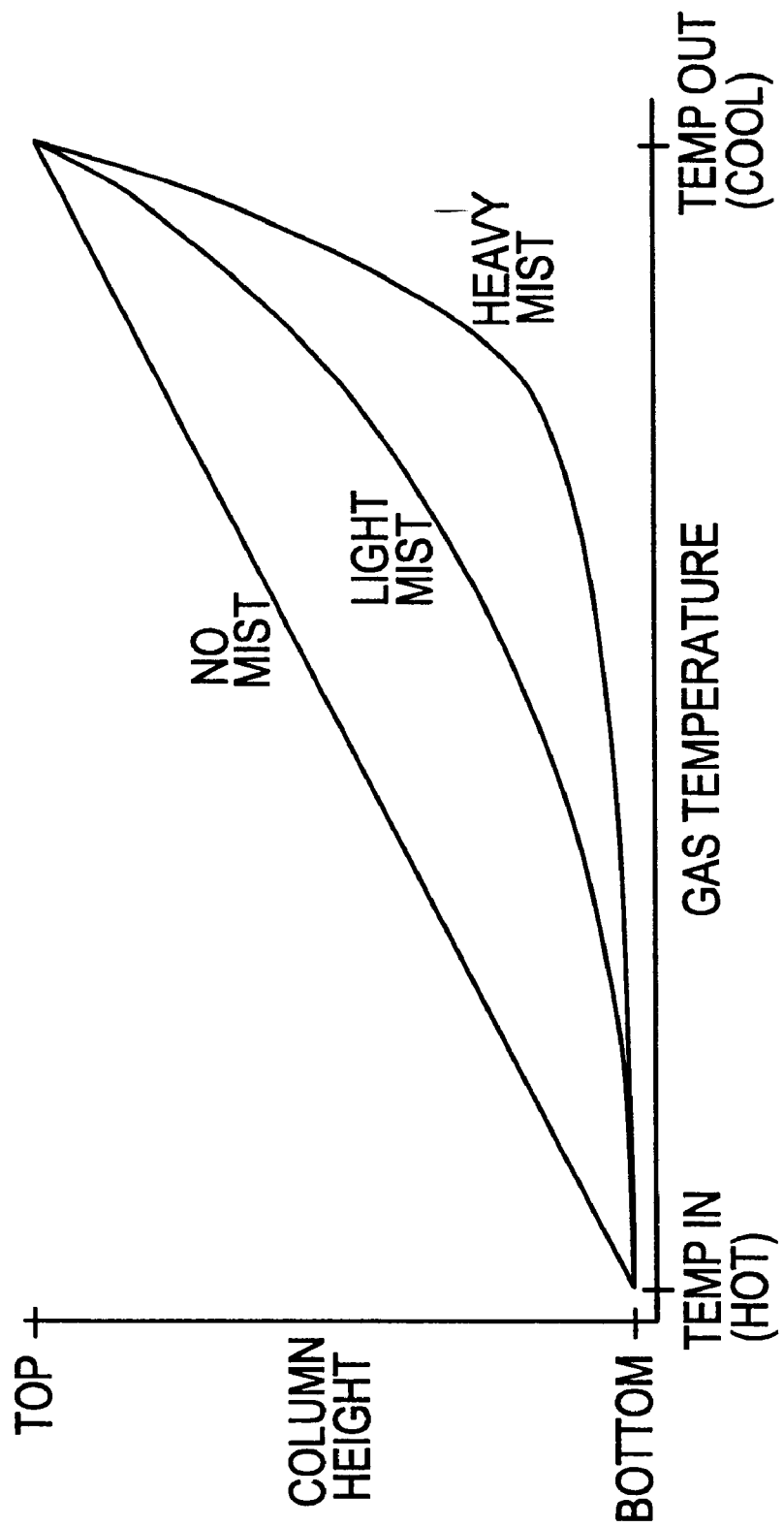

SYSTEM TO QUENCH GASSES AND REMOVE CONDENSABLES

BACKGROUND OF THE INVENTION

1. Field of the Invention

The present invention relates to a method of and apparatus for the quenching and scrubbing of gases. More particularly, the present invention relates to a method of and apparatus for the cooling of hot gas and removal of condensables by counter-current liquid contact between a gas and a cooling/scrubbing solution. The model system is the quenching and scrubbing of nitrogen gas using ethylene glycol.

2. Background

The cooling and purification of gases is important because large quantities of inert gases are used in many commercial processes. One particular such use is in the production of polyethylene terephthalate (PET) polymer. Specifically, inert gases are used during the polymerization reaction of PET to develop molecular weight by removing unwanted byproducts and excess reactants from the polymer resin such as ethylene glycol, acetaldehyde, and water. Hence, the presence of pure inert gases facilitates the solid state polymerization reaction. A complete description of this particular gas cleaning application is -found in several references including U.S. Pat. Nos. 5,434,239; 4,263,425; 4,356,299; 4,340,721 and 4,230,819, all herein incorporated by reference.

Moreover, since effective polymerization depends on the ability of the gas to strip contaminants which in turn depends on the purity of the gas, the polymerization reaction chamber requires continual replenishment of clean gas. Once the gas leaves the polymerization chamber, however, it contains the above mentioned contaminants. Before further use in the polymerization reaction therefore, the gas itself must be cleaned of contaminants. Such recycling reduces the cost associated with supplying a continuous stream of virgin gas to the polymerization reaction chamber while maintaining polymer line throughput.

Cleaning usually consists of cooling the gas by direct contact with a cool liquid so as to cool and condense out contaminants. These steps are respectively referred to as quenching and scrubbing. A typical gas stream exiting a polymer production apparatus is extremely hot, approximately 175° C. It therefore initially requires extensive quenching to complete the recycle process. Only then does it undergo a scrubbing/absorption step where the majority of condensation of gas contaminants occurs.

DESCRIPTION OF THE RELATED ART INCLUDING INFORMATION DISCLOSED UNDER 37 CFR 1.97 AND 1.98

U.S. Pat. No. 5,474,597 ('597) issued to Halldin et al., hereby incorporated by reference, teaches that particulates may be removed from gases by means such as cyclones, electrostatic precipitators or filtration devices, and that gaseous pollutants may be removed from gas streams by direct contact techniques such as by condensation or reaction with a liquid surface, or by adsorption on the surface of a solid. These techniques, however, fail to remove in some cases gaseous or particulate contaminants from gases.

The '597 patent also teaches that gas/liquid direct contact systems can roughly be divided into two categories: open towers where the gas encounters only a finely divided liquid, and packed scrubbers ("packed columns" or "packed towers"), where gases pass through solid structures drenched with cooling liquid.

In packed scrubbers, packing serves to increase the gas/liquid interface by providing a surface on which the finely divided liquid forms a film. Liquid is supplied to the packed sections by nozzles above each packed section. It flows downwardly over essentially the entire surface area of the packing as a substantially continuous liquid film, providing enhanced surface area for gas/liquid interaction, which promotes either gas quenching through heat transfer or scrubbing through condensation and mass transfer of impurities. Accordingly, quenching and scrubbing steps are usually carried out respectively in separate columns, thus comprising the conventional twin column system. The first packed column quenches the hot process gas, while the second packed column then scrubs the quenched gas.

However, these systems are plagued by the problem of aerosol mist formation during quenching. As defined herein, aerosol mists consists of small droplets sized at less than or equal to about 10 microns. Their formation occurs as some of the liquid used to quench the gas diffuses into the gas phase and condenses as a mist, further contaminating the gas. Moreover, unlike larger spray mists, these aerosol mists cannot be removed effectively with conventional in-line droplet removal devices, such as commercially available demisters. Aerosol mist removal therefore requires the use of more expensive external droplet removal systems which are used after the quenched gas exits the packed column. Such systems may consist of a fiber bed and are presently used in many industrial line applications. Eliminating their use is a long-felt need in the industry.

Hence, there is room for improvement in the art for quenching and scrubbing hot gases.

SUMMARY OF THE INVENTION

It is therefore, a principle object of the present invention to provide an improved method of and apparatus for scrubbing an inert gas.

It is an additional object of the present invention to provide an improved method of and apparatus for quenching and scrubbing inert gas in a single column or unit.

It is a further object of the present invention to provide a method of eliminating the formation of aerosol mists during the quenching of hot inert gas.

These and other objects are achieved in one aspect of the present invention by a method of cleaning inert gas. The method comprises sequentially passing a substantially dust-free gas through three contact zones all having solid material packing overflowed with cooling liquid. The gas travels countercurrent to the liquid. In the first zone the liquid quenches the gas at a rate controlled to eliminate the formation of aerosol mist. In the second zone, the cooling liquid scrubs and is thus selected to selectively condense gaseous contaminants in the gas. Cool liquid containing no recycled portion of either of the first two portions of cooling liquid passes over the third contact zone to selectively absorb substantially all contaminants remaining in the quenched and partially scrubbed gas. All of these steps preferably are accomplished in a single treatment column from which a cool, clean gas is produced. This achieves improved removal of particulate and gaseous contaminants from an inert gas thereby to provide a consistent stream of high quality recycled gas without the formation of aerosol mists.

These and other objects are achieved in a second aspect of the present invention by an apparatus for cleaning inert gases. The apparatus comprises: a single column with an inlet for hot, contaminated gas, an outlet for cleaned, cooled gas, and a series of contact sections located therebetween. Each contact section is supplied with liquid by a plurality of nozzles. These nozzles spray divided liquid into each contact zone parallel and counter-current to the main flow direction of the gas.

BRIEF DESCRIPTION OF THE DRAWINGS

FIG. 3 is a column height temperature profile graph showing the relationship of column height versus gas temperature during gas quenching in the first column of the twin column system illustrated in FIG. 2.

DETAILED DESCRIPTION

Figure 1:
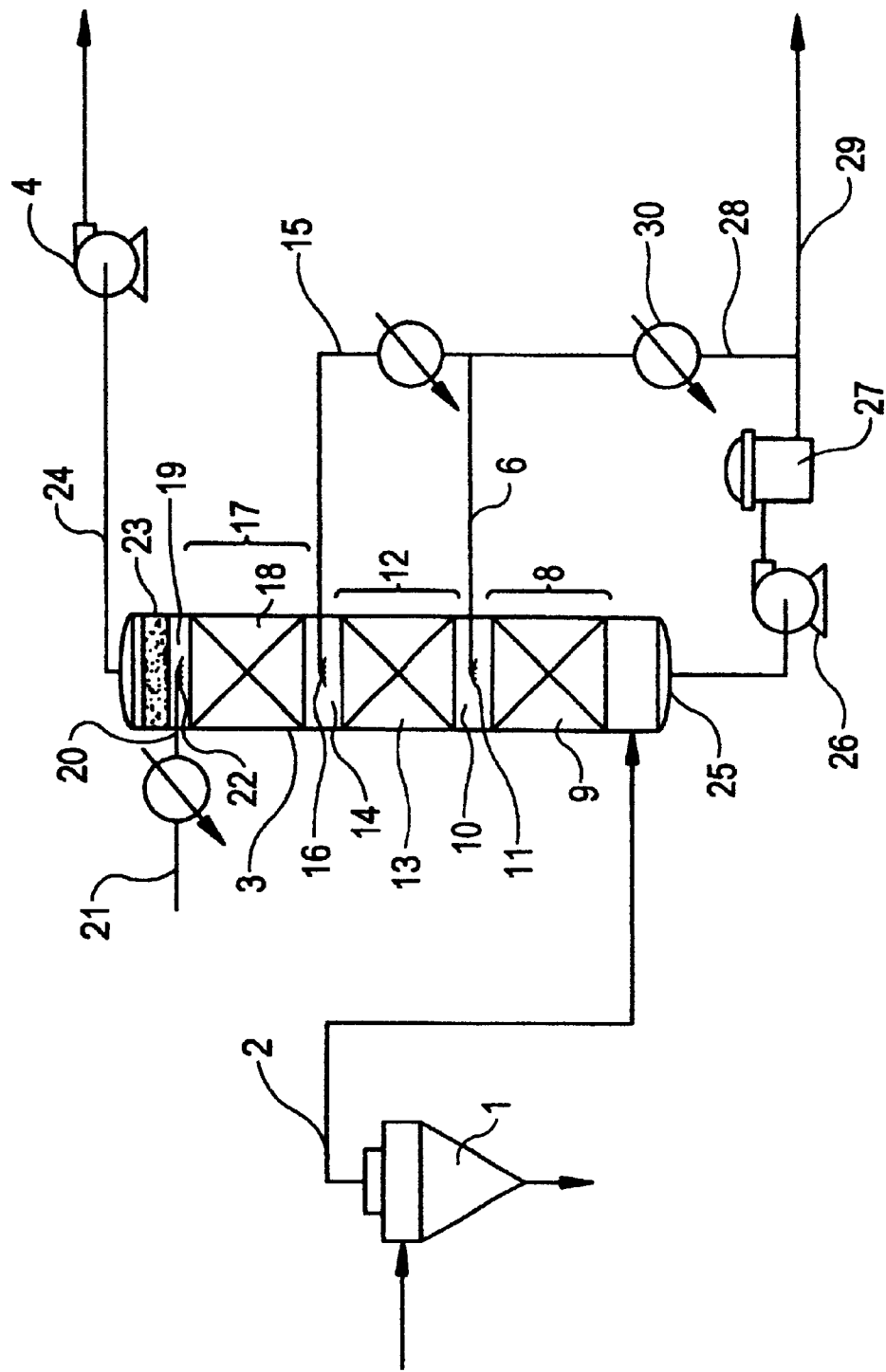
FIG. 1 is an illustration of a vertical cross-section of an inert gas recycling system according to the present invention.

In accordance with this invention it has been found that hot contaminated inert gases may be cooled and cleaned in a single packed column without the formation of aerosol mists. This reduces capital costs associated with the construction of an additional column and additional process control loops. It also eliminates the need for conventional aerosol mist removal (e.g. external droplet removal systems).

More specifically, gases are cleaned of particulates, cooled, and scrubbed of gaseous contaminants. Once particulates are removed, the method of the present invention cools and scrubs gas by passing it through a plurality of packed regions, all contained within a single column and each drenched in a portion of cooling liquid. Gas and cooling liquid flow rates and initial temperatures are also controlled to maintain quenching at a rate which eliminates the formation of aerosol mists. As a result, the present method of gas/liquid contact both cools and condenses out gaseous contaminants from inert gas into a cooling liquid without forming aerosol mists.

The apparatus for and method of the present invention uses direct gas/liquid contact to quench and scrub gas. The method of the present invention quenches hot, substantially particulate free gas. Although quenching can be done by physical heat exchangers, this is known to result in plugging of the heat exchangers and thus significant maintenance efforts. The present invention uses direct contact gas/liquid heat transfer. The present invention further removes condensable contaminants out of the gas by gas/liquid mass transfer. Moreover, the apparatus for and method of the present invention additionally quenches and scrubs gas in a single column system. However, the method of this invention can also be applied to retro fit existing twin tower scrubbers to eliminate an aerosol mist removal system.

The method of the present invention further eliminates the formation of unwanted aerosol mists during quenching of the gas. Both spray mists and aerosol mists generally form when the gas is being quenched, particularly a very hot gas. The presence of both types of mists decreases the quality of recycled gas. As distinguished from spray mists, however, aerosol mists can only be removed using expensive external demisting devices. Therefore, it is particularly advantageous that the method of present invention prevents the formation of aerosol mists. As a result, the present invention provides a method for obtaining a purified, recycled gas without the use of costly external demisting devices.

The apparatus of the present invention is a single column generally containing a plurality of packed sections in order to obtain adequate contact between the gas and the liquid stream. Packing in the scrubbing region may be either structured or unstructured, based on the requirements of a particular application. Structured packing consists of metal sheets, joined so as to form a honeycomb structure. Suitable unstructured packing for use in columns includes saddles, rings, pellets, balls, and other variously shaped packings, and the like made from metals, plastics, ceramics, and the like, as taught by U.S. Pat. No. 5,332,477. Unstructured packing is used in the quenching region of the tower. Hot contaminated gas is directly contacted with finely divided liquid to quench and scrub the gas. Since the efficiency of gas quenching and/or scrubbing is largely dependent on the quality of contact between the liquid and the gas to be treated, it is preferable that the gas flows upwards, counter-current to the liquid.

Furthermore, the liquid stream used to cool and clean the gas stream is any suitable liquid phase stream capable of condensing out the contaminant of interest from the gas stream. Liquids making up such streams are chosen to maximize heat and mass transfer while minimizing mist foundation. Specific examples depend on the application and are taught by Hakka in U.S. Pat. No. 5,017,350 ('350), herein incorporated by reference. In an alternative embodiment, the scrubbing liquid may contain substances which react with the gaseous contaminants, thereby forming solids which separate out and are easily discarded, as described in the '597 reference. A variety of inert gases are cooled and cleansed. A non-exhaustive list includes nitrogen, carbon dioxide, argon, helium, neon, or mixtures thereof.

Regarding aerosol mist removal and further distinguishing spray mists from aerosol mists, Perry and Chilton describe the two general types of liquid-in-gas systems in *Chemical Engineer's Handhook*. 5th Ed. Mc Graw Hill, New York 1973, pp. 18–66 and 18–82. It is believed that aerosol mist, finely divided liquid whose droplet size is less than 10 microns, is formed when the quench rate of the hot inlet gas stream is too high. In this case the liquid ceases quenching the gas through heat transfer. Rather, the quench liquid itself is volatilized into the gas, ultimately condensing to form an extremely fine aerosol mist. This occurs mostly by condensation resulting from super saturation of the gas. Accordingly, aerosol mists are most likely to form as the gas becomes supersaturated with liquid and as the number of nucleation sites provided by foreign particulate matter increases.

Spray mists on the other hand, which consist of droplets larger than about 10 microns, form mostly through entrainment. As such, they are more likely to form at high gas and liquid flow velocities while the gas and the liquid are in contact and depending on the manner of liquid flow. Moreover, unlike aerosol mists, spray mists by virtue of their size can be removed using conventional in-line demisters, i.e. without resorting to costly external demisters. Thus, the present invention allows users to produce quenched and scrubbed gas that is free of aerosol particle contaminants, without resorting to subsequent use of more expensive drop removal systems. This meets a long-felt need by those using gas quenching and scrubbing methods.

For purposes of this disclosure, a mist-free gas is considered to be one having a mist concentration of less than 100 ppm of the scrubbing liquid. A typical $N_2$ gas quenched and scrubbed using ethylene glycol according to the prior art contains approximately 1000 ppm of ethylene glycol prior to passage through an external demister.

One embodiment of the method of the present invention cleans hot, contaminated nitrogen used for the polymerization of PET polymer. In this case, a liquid such as cooled ethylene glycol is supplied from regularly arranged nozzles which may be of various designs. The most general design supplies, around a substantially cylindrical body, finely divided liquid in the shape of a hollow cone or an umbrella-shaped shell. Alternatively, an elongated and substantially straight supply line may be used to provide a finely divided liquid. Nozzles generally supply liquid in a direction, having its main component parallel to and opposite of the direction of the main flow of the gas through the packed column.

The apparatus of the preferred embodiment comprises an elongated upright column containing a plurality of packed sections wherein a gaseous stream is injected into the lower portion of the upright column and a liquid stream is introduced immediately above each packed section in a counter-current manner to the gaseous stream. This is similarly disclosed by Iyer et al. in U.S. Pat. No. 5,332,477 ('477) and incorporated herein by reference. Specifically, three (3) packed sections are employed, and a nozzle arrangement is used in the headspace above each packed section in order to introduce the liquid into the packed column, thereby drenching said packed sections. Structured packing is preferably employed in the packed sections which scrub, or clean the gas, while unstructured packing is preferred for use in the packed section which provides quenching.

More specifically, FIG. 1 provides a not-to-scale cross-sectional schematic view of a gas recycling system designed in accordance with the present invention. First, a majority of the solid particulate entrained in the hot, contaminated gas stream are removed via a cyclone separator 1. The gas stream 2 then enters the bottom of and is drawn up through column 3 by pump 4. The gas enters a first contact zone 8 which functions primarily to quench the gas, and which comprises a first packed section 9 and attendant first headspace 10. A continuous stream of chilled liquid 6 is supplied to first headspace 10 of first contact zone 8 by a nozzle arrangement 11 and flows by gravity over first packed section 9. The cooled contaminated gas exiting packed section 9 and first contact zone 8 then enters an initial scrubbing section, second contact zone 12, which comprises a second packed section 13 and attendant second head space 14. Second packed section 13 is similarly supplied with chilled 15 liquid from a nozzle arrangement 16. After exiting second contact zone 12, the gas continues to rise, entering a third contact zone 17, which functions as a second scrubbing section, and which contains third packed section 18 and attendant third head space 19. The third packed section 18 is drenched with chilled 20 liquid from liquid stream 21 supplied by third nozzle configuration 22. The chilled liquid supplied to packed section 18 is previously unused. The clean cool gas exiting packed section 18 then passes through a demister 23, in order to remove liquid spray which may become entrained in the gas stream during the recycle process. The clean, cool demisted gas then exits the top of column 3 through stream 24. Used cooling liquid is collected in a pool 25 at the bottom of column 3. Pump 26 removes the used liquid and supplies it to filter 27. After filtration, the major portion of the filtered liquid is returned to column 3 via stream 28, and a minor portion of the filtered liquid stream is purged, via stream 29, to accommodate the flow of virgin liquid into the third contact zone 17.

One example of the apparatus and method illustrated in FIG. 1 further operates according to the following specifications. A single column counter-current inert gas recycling system, 700 mm in diameter, receives contaminated 170° C. nitrogen at 9000 scfm from a single cyclone separator. A typical nitrogen stream exiting a PET polymerization chamber contains condensable contaminants including ethylene glycol, acetaldehyde, water, and a small amount of solid particulate in the form of oligomeric dusts.

Hot, contaminated nitrogen travels up into the first contact zone to be quenched. The first contact zone has a total height of 2500 mm, with a packed bed height of 1500 mm, and is filled with unstructured packing. The first contact zone is drenched with 45° C. ethylene glycol flowing at 250 gpm, supplied by a nozzle arrangement contained in the headspace 10 of contact zone 8.

The quenched nitrogen then travels up the column and is scrubbed of gaseous contaminants in a second contact zone. Contact zone 12 has a total height of 3500 mm, a packed bed height of 2500 mm, and is filled with, for example, Mellapak 250 Y packing. The second contact zone is drenched with ethylene glycol at a temperature of 5° C., flowing at 150 gpm, supplied by a liquid distributor tray arrangement contained in the headspace 14 of contact zone 12. The ethylene glycol fed to the bottom 2 sets of nozzle arrangements (11, 16) is provided by a closed loop recycle system, in order to minimize the cost of operation.

The quenched, partially scrubbed nitrogen gas next passes upward through contact zone 17. Contact zone 17 has a total height of 3100 mm, a packed bed height of 2500 mm and is filled with, for example, Mellapak 250 Y packing. Contact zone 17 is drenched with virgin ethylene glycol at a temperature of 8° C., flowing at 10 gpm, and supplied by a liquid distributor tray arrangement contained in the headspace 19 of contact zone 17. The quenched, scrubbed nitrogen then travels through an in-line wire mesh demister and exits the recycle system. The nitrogen gas exiting the system is expected to contain less than 1000 ppm acetaldehyde, less than 100 ppm ethylene glycol, and less than 50 ppm water. Further, the gas is substantially free of solid particulate, and is at a temperature of approximately 10° C. As a final step, the stream of used coolant, is filtered of oligomers or other solid contaminants before its reuse.

In one embodiment as illustrated in FIG. 1 and described above, aerosol mists formation can be eliminated using a quench rate of less than about 5.4° C./ft$^2$ of packing. This method, coupled with the use of an in-line demister for eliminating residual spray mist, will provide a consistent flow of mist-free high quality recycled gas.

Figure 2:
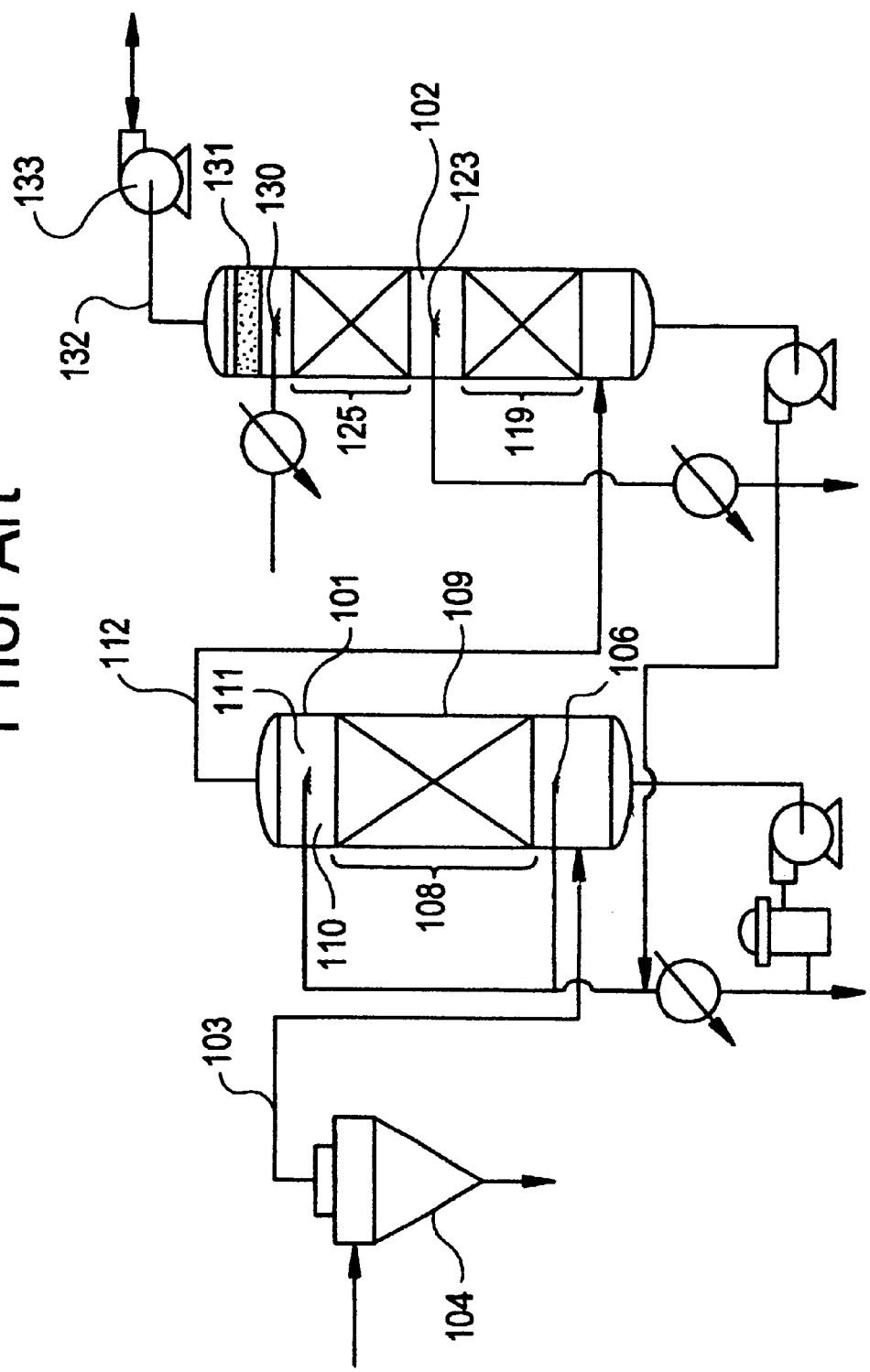
FIG. 2 is an illustration of a vertical cross-section of a conventional twin column inert gas recycling system.

FIG. 2 illustrates the prior art twin tower scrubber. The first tower 101 is used for quenching and the second tower 102 for scrubbing. Gas 103, having passed through a dust-removing cyclone 104 is introduced to the bottom of tower 101. Prior to entry into first contact zone 108 containing packing 109, it is conventional to spray the gas with quench/scrub liquid from spray head 106. Packing 109 is further wetted with liquid from spray head 111 in section 110. The gas is withdrawn from the top of the quench tower by line 112 and introduced to the bottom of scrubber tower and drawn through packed sections 119 and 125 respectively which are wetted from spray heads 123 and 130 respectively. The gas then passes through demister 131 and is discharged via line 132 drawn by pump 133.

It has been found that the spray head 106 is a significant source of aerosol mist and the elimination of spray from 106 is a part of this invention.

A good explanation of the mechanisms of both types of mist formation is taught by Schaber in *Aerosolbildung dirch spontane Phasenuebergaenge bei Absorptions—und Kondensationsprozessen*, Chemie Ingenieur Technik (67) 11/1996, pp. 1443–1452. In the present application the mechanism of coupled heat and mass transfer is important.

Normally this occurs when the gas cools faster than the condensable contaminant gases can be removed. In countercurrent condensers the initial temperature difference of gas and coolant at the gas inlet is crucial. As this difference widens, the probability and degree of excess saturation increases. That means also that if the cooling liquid film becomes warmer, the condensation proceeds close to or along the dew point line resulting in less mist formation.

Therefore, the present invention provides a method of controlling conditions within the packed column so as to avoid the formation of aerosol mists. As mentioned above, aerosol mists form when the initial quench rate of the hot inlet gas is excessive. Aerosol mist formation is primarily a function of the hot gas temperature profile inside the first packing section and may be expressed in terms of gas temperature over an area of packing. At constant flow rates, it may also be expressed in terms more simplified of gas temperature versus column height as shown in FIG. 3.

FIG. 3 illustrates the formation of mists during rapid quenching as represented by the non-linear temperature profiles. The quench rate can be determined by measuring gas and liquid temperature and the flow rates. Reducing ethylene glycol recirculation rates causes the aerosol mist to disappear. Raising nitrogen throughput achieved similar results in aerosol mist elimination. Hence, an optimal mass ratio of nitrogen flow and circulating ethylene glycol flow through the first packed column may be achieved. In accordance with this invention it has been found that this ratio must be maintained above about 0.12 to avoid aerosol mist formation. Furthermore, this condition requires that the ethylene glycol temperature in the bottom of the column be no less than 55° C. In essence, these conditions allow a more gradual cooling of nitrogen and condensation of ethylene glycol.

The quench rate may be calculated using the following formulae:
Iteratively solve for $T_{no}$ $$\frac{(T_{no} - T_{gi}) - (T_{ni} - T_{go})}{\ln \frac{(T_{no} - T_{gi})}{(T_{ni} - T_{go})}} = \frac{m_n C_{pn}(T_{ni} - T_{no})}{UA}$$

where $U = \frac{h_g h_n}{h_g + h_n}$ (global heat transfer coefficient)

and $m_n$=mass flow of $N_2$
$C_{pn}$=heat capacity of $N_2$
$T_{gi}$, $T_{ni}$=inlet glycol and $N_2$ temp
$T_{go}$, $T_{no}$=outlet glycol and $N_2$ temp after 1 ft$^2$ packing area
A=surface area of packing specifed to be 1 ft$^2$
$h_n = k_n Re_n^{0.8} Pr_n^{0.33}/D_e$
$h_g = k_g Re_g^{0.8} Pr_g^{0.33}/D_e$
$h_n$=heat transfer coefficient for $N_2$
$h_g$=heat transfer coefficient for ethylene glycol
$k_n$, $k_g$=fluid thermal conductivity
$D_e$=equivalent column diameter
Re=Reynolds number
Pr=Prandtl number
$Q = (T_{no} - T_{ni})/A$ where A=1 ft$^2$ packing area $T_{ni}$ is initial temperature of said gas
$T_{n0}$ is final temperature of said gas after 1 ft$^2$ packing area.
Q is the nitrogen quench rate whereby, with Q less than 5.4° C./ft$^2$, aerosol mist free gas is produced.

In the preferred embodiment for the $N_2$ scrub with ethylene glycol, inlet and outlet temperatures are kept constant. Typical temperatures of hot inlet gas range from about 160–220° C. After quenching, the gas temperature ranges from about 35–65° C. After the absorption step, final gas temperature ranges should be between 0–15° C. However, as mentioned above quench rates must be kept below about 5.4° C./ft$^2$ of packing. To ensure this, the preferred embodiment calls for two conditions in this regard. First, a control valve on the cooling water return from heat exchanger 30 is used to control the temperature of the recirculating glycol through the first scrubber. Second, and more significantly, the temperature of the gas exiting the quenching region is monitored and controlled. The temperature of gas exiting the quenching section typically ranges from about 45–60° C. Moreover, aerosol mist formation never occurs at about 60° C. but occasionally occurs at about 45° C., because of the quench rates correlated to these two temperatures. Therefore, a control scheme is set up to maintain the temperature of nitrogen exiting the first quenching section at about 60° C. This is achieved by varying the temperature and/or flow of the recirculating glycol. Because of the method of operation of a PET polymerization process, the inlet gas temperature may be controlled to around 170° C. Since the temperature at the end of the quenching phase also is held constant, a sufficiently low quench rate results, when using a constant flow rate.

EXAMPLE 1

Aerosol mist elimination by slowed quenching may be shown in twin column systems as well as single column systems. For example, when cleaning nitrogen with cool ethylene glycol and using the conventional twin column system illustrated in FIG. 2, flow rates were varied to control the amount of aerosol mist formation in the quenching column. The following results were obtained specifically by varying the flow rates of gas and cooling liquid within the first column of this twin column system. Also, results were based on the total flow of ethylene glycol since instrumentation to measure individual flow to the spray bar and column top was not available. Low ethylene glycol recirculation rates (680 gpm) yielded the best gas quality. In fact, no mists were detectable at any condition where the glycol flow was at or below 680 gpm. Similarly, acceptable gas quality was always achieved at high gas throughputs (13,600 scfm). Conversely, high ethylene glycol recirculation flow rates (880 gpm) coupled with low gas throughputs (9600 scfm) were by far the worst conditions yielding light to heavy type mist. Results show a gas to liquid mass ratio of 0.12 to be the cut off point for mist formation. No mist was detected at any condition where the ratio was 0.12 at constant respective temperatures of 60° C. for ethylene glycol and 175° C. for inlet nitrogen. However, it must be noted again that the gas to liquid ratio does not go to the heart of the phenomena disclosed herein; it is rather the gas temperature profile as it passes from the column inlet until it passes out of the first contact zone which determines the formation of aerosol mist. Therefore, the rate of quenching as a function of temperature decrease over area of packing must ultimately be controlled.

Manipulation of conditions for the first column had no noticeable impact on performance of the second column.

This is explained by the presence of excess cooling capacity in the portion of ethylene glycol presented to the first column which in turn assured a consistent flow of uniform temperature recycled ethylene glycol. As a result a consistent flow of like-temperature nitrogen was provided to the second column. Reported measurements of none, light, and heavy are based on visual inspection through a sight glass in an outlet pipe.

Accordingly, it is seen that the present invention provides an apparatus for and method of cleaning inert gases in a single column without the formation of aerosol mists by sequentially passing a substantially dust free gas through three contact zones all having solid material packing overflowed with cooling liquid. The gas travels countercurrent to the liquid. In the first zone the liquid quenches the gas at a rate slow enough to eliminate the formation of aerosol mist. In the second zone, the cooling liquid scrubs and is thus selected to selectively condense gaseous contaminants in the gas. Cool liquid containing no recycled portion of either of the first two portions of cooling liquid passes over the third contact zone to selectively absorb substantially all contaminants remaining in the quenched and partially scrubbed gas. All of these steps are accomplished in a single treatment column wherein cool, clean gas is produced. Alternatively, these steps are also useful within conventional twin column apparatuses but the associated expense of construction and operation have been shown to be unnecessary.

Moreover, Applicants know of no column for quenching and scrubbing of inert gas used in the production of PET or other polymers for which the general principles and methods described herein above would not be applicable. This is true regardless of variations in basic input, throughput and output parameters. A variety of gas cleaning systems are in fact expected to greatly benefit from application of the principles disclosed herein.

It will be understood that various details of the invention may be changed without departing from the scope of the invention. Furthermore, the foregoing section description is for the purpose of illustration only, and not for the purpose of limitation as the invention is defined by the claims herein below.

We claim:

1. A gas/liquid contact method for quenching and scrubbing inert gas, comprising the steps of:

providing a first contact zone having packing being flowed over by a liquid;

quenching a gas by passing said gas through said first contact zone in a substantially countercurrent direction to said first portion of said liquid at a quench rate less than about 5.4° C./ft$^2$ of packing, creating a quenched gas;

providing a second contact zone having a second packing being flowed over by a liquid;

partially scrubbing said quenched gas by passing said quenched gas through said second contact zone in a substantially countercurrent direction to said liquid, creating a quenched and partially scrubbed gas;

providing a third contact zone having a third packing being flowed over by a cooled liquid; and passing said quenched and partially scrubbed gas through said third contact zone in a substantially countercurrent direction to said cooled liquid, creating a quenched and scrubbed gas;

whereby cool, clean gas is produced.

2. A gas/liquid contact method for quenching and scrubbing inert gas, comprising the steps of:

providing a first contact zone having packing, said packing being flowed over by a first portion of a cool liquid;

quenching a substantially particulate free gas by passing said gas through said first contact zone in a substantially countercurrent direction to said first portion of said cool liquid, at a quench rate of less than about 5.4° C./ft$^2$ of packing creating a quenched gas;

providing a second contact zone having a second packing, said second packing being flowed over by a second portion of said cool liquid, said second portion of cool liquid adapted to selectively condense contaminants contained in said quenched gas;

partially scrubbing said quenched gas by passing said quenched gas through said second contact zone in a substantially countercurrent direction to said second portion of said cool liquid, creating a quenched and partially scrubbed gas;

providing a third contact zone having a third packing, said third packing being flowed over by cooled virgin liquid to selectively absorb substantially all contaminants remaining in said quenched and partially scrubbed gas; and passing said quenched and partially scrubbed gas through said third contact zone in a, substantially countercurrent direction to said third portion of cool liquid, creating a quenched and scrubbed gas;

wherein said first, second and third contact zones are disposed vertically in a single column.

3. The gas/liquid contact method according to claim 2 wherein said gas is inert.

4. The gas/liquid contact method according to claim 2 wherein said cool liquid is ethylene glycol.

5. The gas/liquid contact method according to claim 2 wherein the packing in said first contact zone is unstructured packing.

6. The gas/liquid contact method according to claim 1 further comprising the step of subjecting said quenched and scrubbed gas to an internal demister droplet removal system.

7. The gas/liquid contact method according to claim 2 further comprising the step of subjecting said quenched and scrubbed gas to an internal demister droplet removal system.

8. The gas/liquid contact method according to claim 3 wherein said gas is nitrogen.

* * * * *